(12) United States Patent
Heggdal

(10) Patent No.: US 9,779,856 B2
(45) Date of Patent: Oct. 3, 2017

(54) ARRANGEMENT FOR COOLING POWER CABLES, POWER UMBILICALS AND CABLES

(71) Applicant: AKER SUBSEA AS, Lysaker (NO)

(72) Inventor: Ole A. Heggdal, Finstadjordet (NO)

(73) Assignee: AKER SOLUTIONS AS, Lysaker (NO)

( * ) Notice: Subject to any disclaimer, the term of this patent is extended or adjusted under 35 U.S.C. 154(b) by 115 days.

(21) Appl. No.: 14/379,640

(22) PCT Filed: Feb. 20, 2013

(86) PCT No.: PCT/NO2013/050033
§ 371 (c)(1),
(2) Date: Aug. 19, 2014

(87) PCT Pub. No.: WO2013/125962
PCT Pub. Date: Aug. 29, 2013

(65) Prior Publication Data
US 2015/0041171 A1    Feb. 12, 2015

(30) Foreign Application Priority Data

Feb. 20, 2012  (NO) .................................. 20120174

(51) Int. Cl.
*H01B 17/00* (2006.01)
*H01B 7/42* (2006.01)
(Continued)

(52) U.S. Cl.
CPC .............. *H01B 7/423* (2013.01); *G02B 6/442* (2013.01); *H01B 7/045* (2013.01)

(58) Field of Classification Search
CPC ......... H01B 7/045; H01B 7/423; G02B 6/442
(Continued)

(56) References Cited

U.S. PATENT DOCUMENTS 3,170,026 A * 2/1965 Woodson ................. H01B 7/29
  137/340
3,429,979 A * 2/1969 Davey ...................... H01B 7/29
  174/15.6
(Continued)

FOREIGN PATENT DOCUMENTS

CN      201868143 U    6/2011
DE       3528585 A1    2/1987
(Continued)

OTHER PUBLICATIONS

Bartnikas et al., "Chapter 1 Cables: A Chronological Perspective," Power and Communication Cables: Theory and Applications, Wiley—IEEE Press, Jan. 2003, pp. 1-75.

*Primary Examiner* — Timothy Thompson
*Assistant Examiner* — Rhadames J Alonzo Miller
(74) *Attorney, Agent, or Firm* — Birch, Stewart, Kolasch & Birch, LLP

(57) ABSTRACT

A power cable ($C_1$), or power umbilical, comprising a number of electric high power cables (10) for transfer of large amounts of electric power/energy; filler material (2, 3, 4, 5, 6) in the form of stiff elongate plastic elements; the number of electric high power cables (10) and stiff elongate plastic elements (2, 3, 4, 5, 6) being gathered in a twisted bundle by means of a laying operation; a protective sheath (1) that encompasses the electric cables and the filler material; and at least one longitudinally extending channel (6) is provided for forced flow transportation of a cooling agent through said power cable/umbilical in order to cool down the electric high power cables (10) and their insulation material from a critical temperature value of about 90° C.

13 Claims, 5 Drawing Sheets

Figure 1:
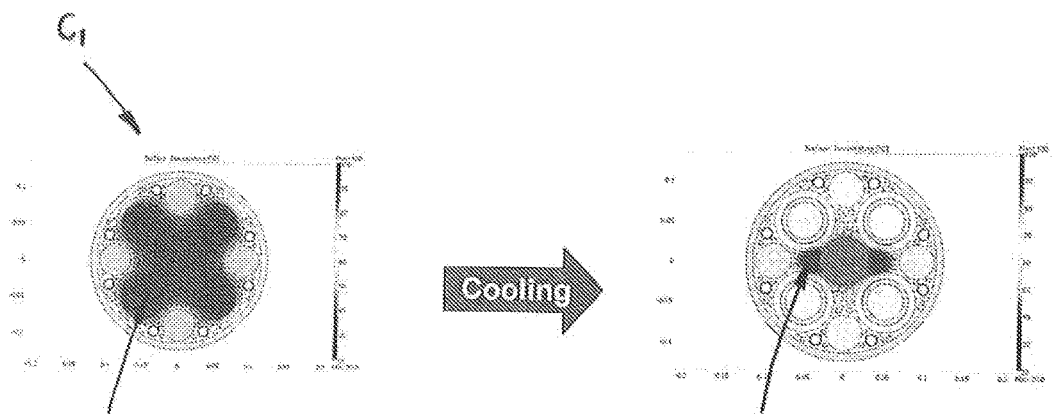

(51) Int. Cl.
 *H01B 9/06* (2006.01)
 *H01B 7/04* (2006.01)
 *G02B 6/44* (2006.01)

(58) Field of Classification Search
 USPC .................................................. 174/15.6, 156
 See application file for complete search history.

(56) References Cited

U.S. PATENT DOCUMENTS

| | | | |
|---|---|---|---|
| 3,551,581 A | 12/1970 | Goodman | |
| 3,758,699 A | 9/1973 | Lusk et al. | |
| 3,924,054 A * | 12/1975 | Falke | H01B 7/29 174/110 PM |
| 5,451,718 A * | 9/1995 | Dixon | H01B 7/288 156/54 |
| 5,458,691 A | 10/1995 | Daniels | |
| 5,979,506 A * | 11/1999 | Aarseth | F16L 53/008 138/114 |
| 6,012,495 A * | 1/2000 | Antonsen | C23F 13/16 138/131 |
| 6,046,404 A * | 4/2000 | Figenschou | E21B 17/01 138/111 |
| 6,146,052 A * | 11/2000 | Jacobsen | E21B 17/015 166/338 |
| 6,472,614 B1 * | 10/2002 | Dupont | H01B 7/0072 138/110 |
| 6,940,054 B1 * | 9/2005 | Heggdal | F16L 9/19 138/149 |
| 7,473,844 B2 * | 1/2009 | Figenschou | E21B 17/203 174/110 R |
| 7,629,535 B2 * | 12/2009 | Espen | F16L 53/007 174/102 R |
| 2002/0122664 A1 * | 9/2002 | Mjelstad | F16L 53/007 392/478 |
| 2003/0015436 A1 * | 1/2003 | Bass | C23F 13/02 205/740 |
| 2003/0116212 A1 * | 6/2003 | Thomson | F16L 11/088 138/111 |
| 2004/0109651 A1 * | 6/2004 | Lancaster | G01K 11/32 385/101 |
| 2005/0123254 A1 * | 6/2005 | Oh | H01B 7/324 385/101 |
| 2005/0217890 A1 * | 10/2005 | Efraimsson | H01B 7/288 174/105 R |
| 2006/0137880 A1 * | 6/2006 | Figenschou | E21B 17/203 166/367 |
| 2006/0193572 A1 * | 8/2006 | Mjelstad | G02B 6/4427 385/101 |
| 2006/0243471 A1 * | 11/2006 | Karlsen | F16L 53/007 174/15.1 |
| 2007/0044992 A1 * | 3/2007 | Bremnes | F16L 53/007 174/102 R |
| 2007/0205009 A1 * | 9/2007 | Figenschou | F16L 11/127 174/47 |
| 2007/0237469 A1 * | 10/2007 | Espen | F16L 53/007 385/100 |
| 2007/0240893 A1 * | 10/2007 | Bremnes | F16L 53/007 174/36 |
| 2008/0236810 A1 * | 10/2008 | Bornes | E21B 43/01 166/61 |
| 2010/0012342 A1 * | 1/2010 | Figenschou | F16L 11/088 174/47 |
| 2010/0054677 A1 * | 3/2010 | Figenschou | H01B 7/045 385/101 |
| 2012/0037611 A1 * | 2/2012 | Karlsen | F16L 1/123 219/528 |
| 2012/0082422 A1 * | 4/2012 | Sarchi | G01K 11/32 385/101 |

FOREIGN PATENT DOCUMENTS

| | | | | |
|---|---|---|---|---|
| DE | EP 0562331 A2 * | 9/1993 | | H01B 7/423 |
| EP | 0 562 331 A2 | 9/1993 | | |
| FR | 608.155 | 7/1926 | | |
| KR | 10-2006-0080136 A | 7/2006 | | |
| NO | 104 641 | 8/1964 | | |
| NO | 328458 B1 | 6/2008 | | |
| WO | WO 2010/075873 A1 | 7/2010 | | |
| WO | WO 2011/059337 A1 | 5/2011 | | |
| WO | WO 2011/065842 A1 | 6/2011 | | |

* cited by examiner

ARRANGEMENT FOR COOLING POWER CABLES, POWER UMBILICALS AND CABLES

The present invention relates to an arrangement for cooling power cable, power umbilicals, cables, power cable risers, umbilicals, integrated flowline umbilicals/cables, which in the following text is referred to by the general term "high power cable".

Cooling is required for cables, risers, bundles, pipe/cables bundles, all longitudinal products with embedded high power cables that generate heat due to surrounding thermal insulation, stagnant hot air, trenched cables in mud or sand, heat from flowlines or other process activity. Normally, water will be used as the cooling agent, but other fluids are conceivable if desired or necessary due to a particular use or circumstance. The water may be especially treated or cleaned process water.

An example when cooling is necessary is described in the following section. A cable that will experience temperatures above what the materials in the cable can withstand needs to be cooled. By injecting cooling fluid trough the structure in defined channels, the temperature will fall. In a typical incident, the temperature will fall with approx. 25° C. With temperatures close to 90° C., it is of vital importance to cool the cable. The cable insulation materials that are used are normally PEX Cross Linked PE. The design limit temperature for this material is 90° C. If the cable is too warm, the lowering of the temperature by 5, 10 or 15 degrees from the design limit will at least double the service life of the cable.

When it comes to DEH cables (Direct Electric Heating) and riser designs, the DEH cables are in most cases supplied with electric power by a dynamic power cable from the topside power supply, and connected subsea to a power cable. Experiences show that the worst case regarding temperature conditions for the cables occurs in the region where the riser is above the sea water. The riser may be located inside a steel tube which increases the heat in the cable. The "traditional design" requires large conductor cross sections (1600 mm$^2$) in order to keep the cable temperature below the limit of 90° C., which is the limit for the cable insulation XLPE. To supply three pipeline sections with the traditional design, six cable conductors are required. An alternative solution is to supply these sections with one four core and one two core riser cable. The maximum temperature occurs in the riser with four cores. Computations have been carried out given a current of 1430 A, which is required for heating a pipeline with a U-value of 2.5 Wm$^2$K. The temperature plot for this configuration is shown in FIG. 1. As seen in the figure, the temperature limit of 90° C. is exceeded.

Figure 2:
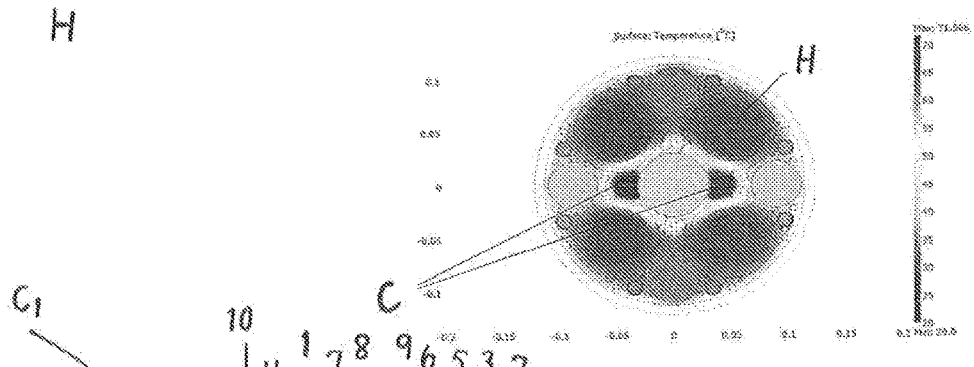

A possible solution, as now suggested, is to reduce the temperature by using water, or another type of cooling agent, in order to cool down the inside of the riser. FIG. 2 shows a solution with water cooling supplying 20° C. water in two 16 mm in diameter pipes close to the center of the umbilical. With such a water cooling arrangement the maximum temperature is reduced to 70° C., which is well below the 90° C. limit of the cable.

In more detail the present invention relates to a power cable, or power umbilical, comprising a number of electric high power cables for transfer of large amounts of electric power/energy; filler material in the form of stiff elongate plastic elements located at least partially around and between the number of electric cables, the number of electric cables and stiff elongate plastic elements being gathered in a twisted bundle by means of a laying and closing operation; at least one load carrying element at a predetermined location in the cross section of the power cable/umbilical, the number of electric cables, the stiff elongate plastic elements and the at least one load carrying element, are either laid in a continuous helix, or alternately laid, i.e. by continuously alternating direction, in the entire or part of the longitudinal extension of the power cable/umbilical, to form a bundle.

According to the present invention a power cable, or power umbilical of the above said kind is provided, which is distinguished in that at least one longitudinally extending channel is provided for forced flow transportation of a cooling agent through said power cable/umbilical in order to cool down the electric cables and their insulation material from a critical temperature value of about 90° C.

In a preferred embodiment, the channels further include gaps, slits or any openings, transversally and/or longitudinally extending in said power cable/umbilical, said channels, gaps and slits enable flooding of the internals of said power cable/umbilical, which flooding enables heat transfer from the electric cables to the cooling agent for evacuation of said heat.

In a practical embodiment, the at least one longitudinally extending channel is terminating on board a vessel at an umbilical hangoff point comprising cooling agent tubes connecting with said one or more channels for transfer of said agent by means of gravity or by pressure provided by a pump or similar.

Further, the at least one longitudinally extending channel at some predefined distance into the sea is provided with laterally extending draining holes communicating with said channels, which laterally extending draining holes in turn communicates the cooling agent into the surrounding sea.

Preferably, the cooling agent is pure water, especially treated water or cleaned process water.

In one embodiment the at least one longitudinally extending channel at some predefined distance into the sea is interconnected by means of a crossover to a similar channel for the forming of a closed circuit for the cooling agent, one of the channels being provided for the supply of cooling agent while the other channel being provided for the return to the surface of said cooling agent.

The cooling length of the power cable/umbilical may vary and can extend over a length such as 30-200 meters, where one crucial length regarding heat build up is in the section of open air from the umbilical hangoff point to the sea surface. However, cooling of the entire length is definitely possible.

The power cable, or power umbilical, may in one embodiment include at least one fluid pipe in the cross section, made of metal and/or plastic material.

Normally, but not necessarily, the power cable, or power umbilical, may have a protective sheath that encompasses the twisted bundle of electric power cables, the load carrying elements and the filler material. In stead of the protective sheath, the bundle may be just strapped at regular intervals, depending of the actual usage.

In such an embodiment, the laterally extending draining holes also extend laterally through the outer sheath.

In another embodiment the power cable/umbilical may have at least two fluid pipes of metallic material in the cross section, which fluid pipes are arranged in a closed circuit by means of a crossover piece between said fluid pipes, one of the fluid pipes being provided for the supply of cooling agent while the other fluid pipe being provided for the return to the surface of said cooling agent. This is particularly true when the cooling agent is an antifreeze coolant, such as a glycol based agent.

The load carrying elements can either be steel wire ropes or steel rods or a combination of them.

Further, the fluid pipes in the cross section may also include pipes for transport of other fluids like hydraulic fluid.

Still further, the power cable/umbilical may also include regular electric signal wires and/or fibre optic conductors or a combination thereof.

Figure 3:
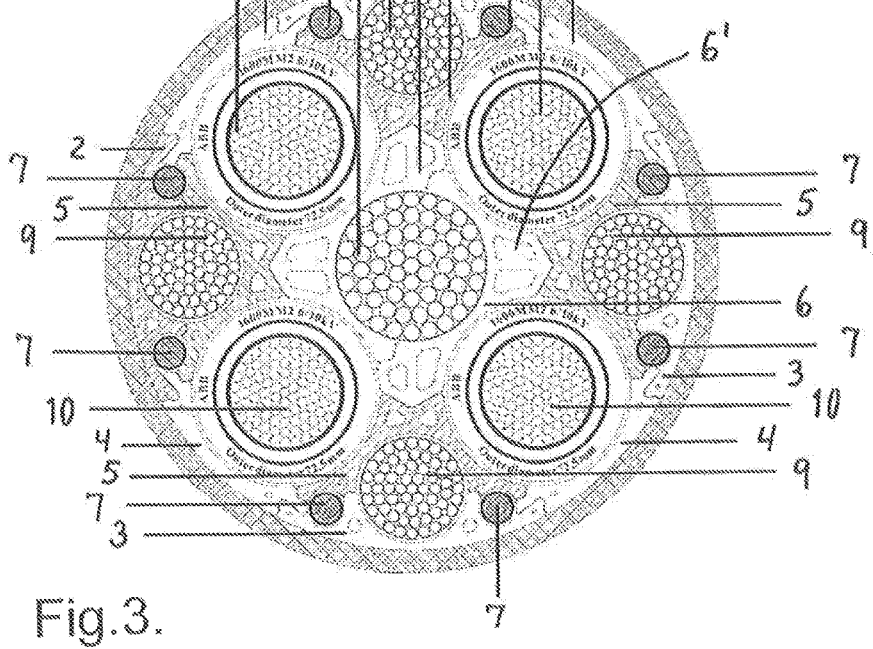
Figure 4:
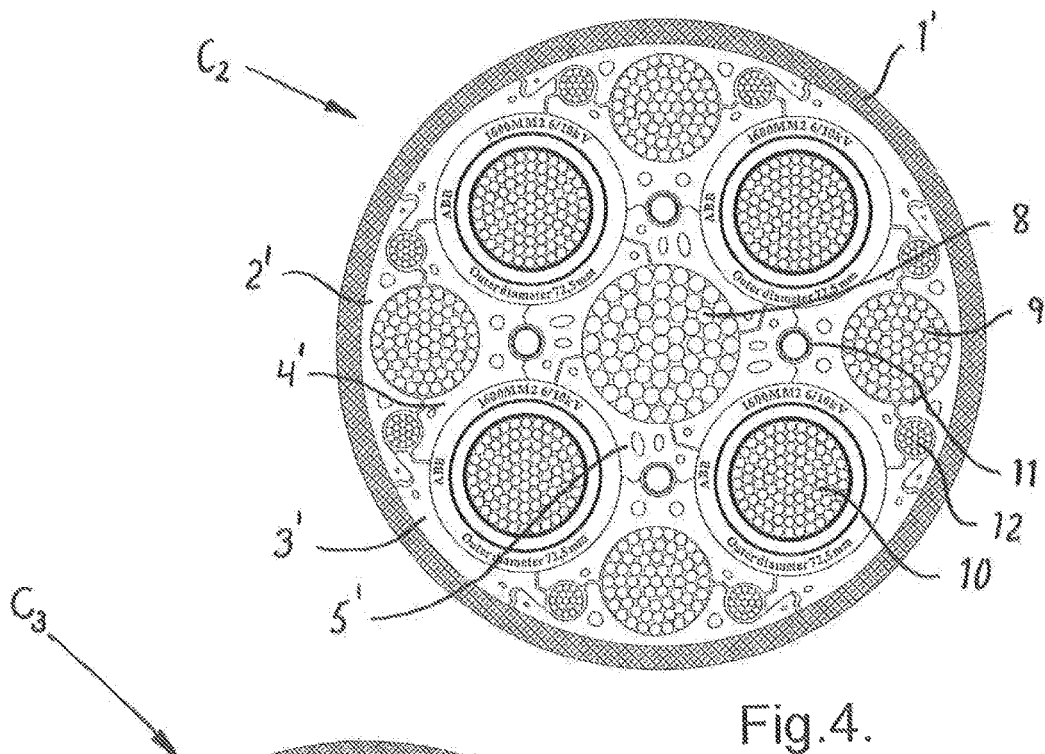
Figure 5:
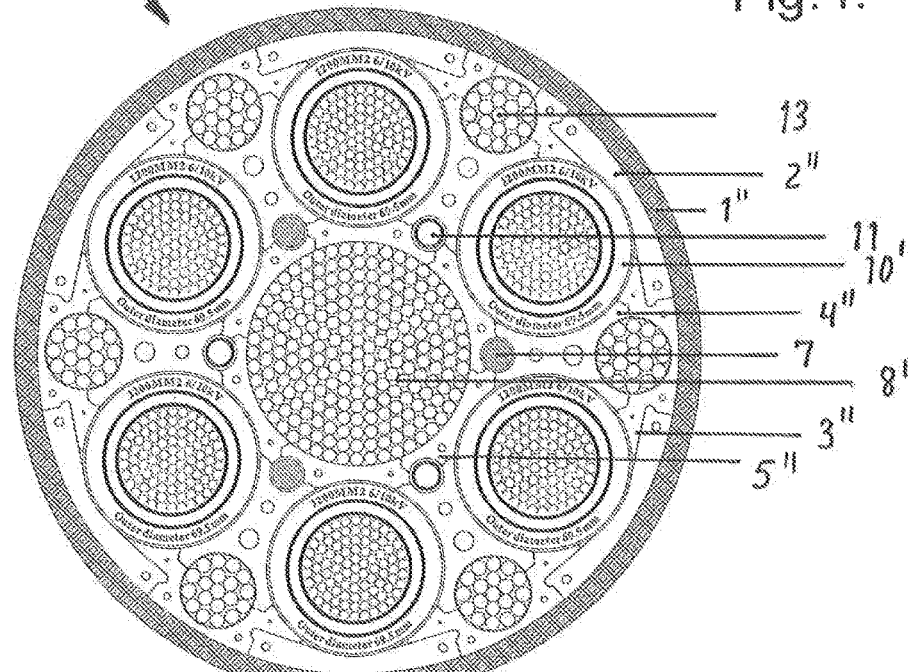
Figure 6:
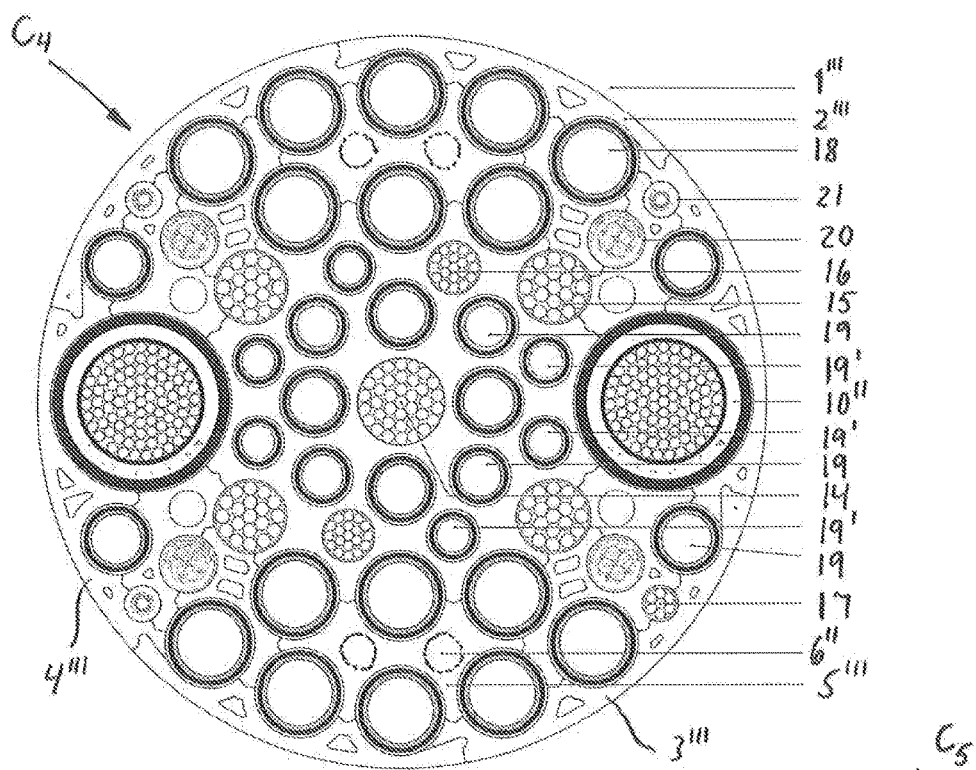
Figure 7:
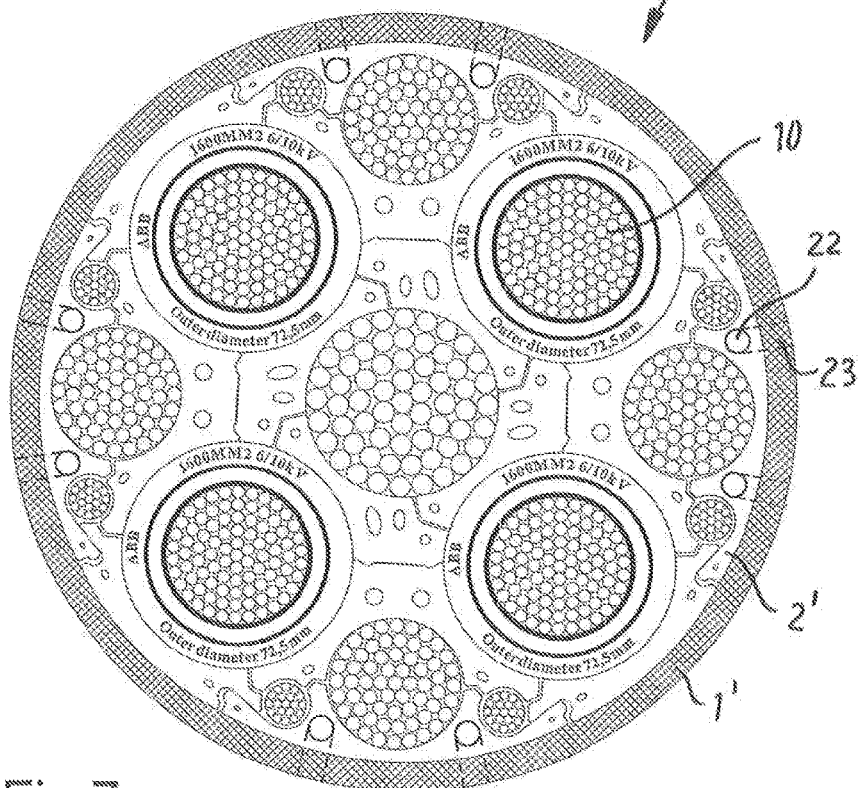
Figure 8:
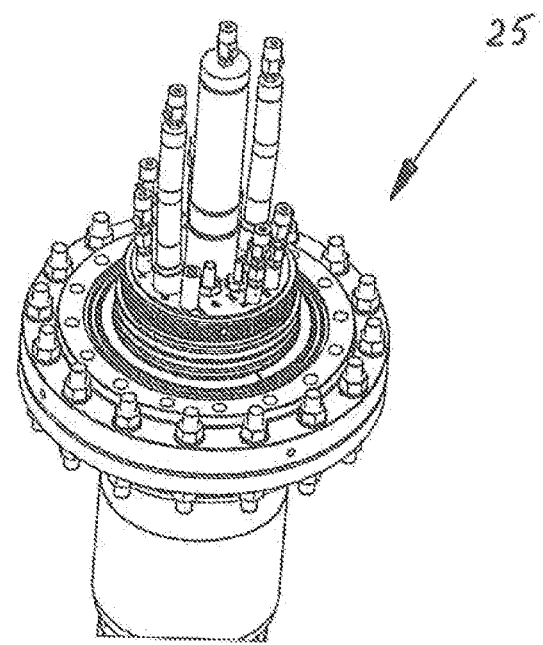
Figures 9, 10:
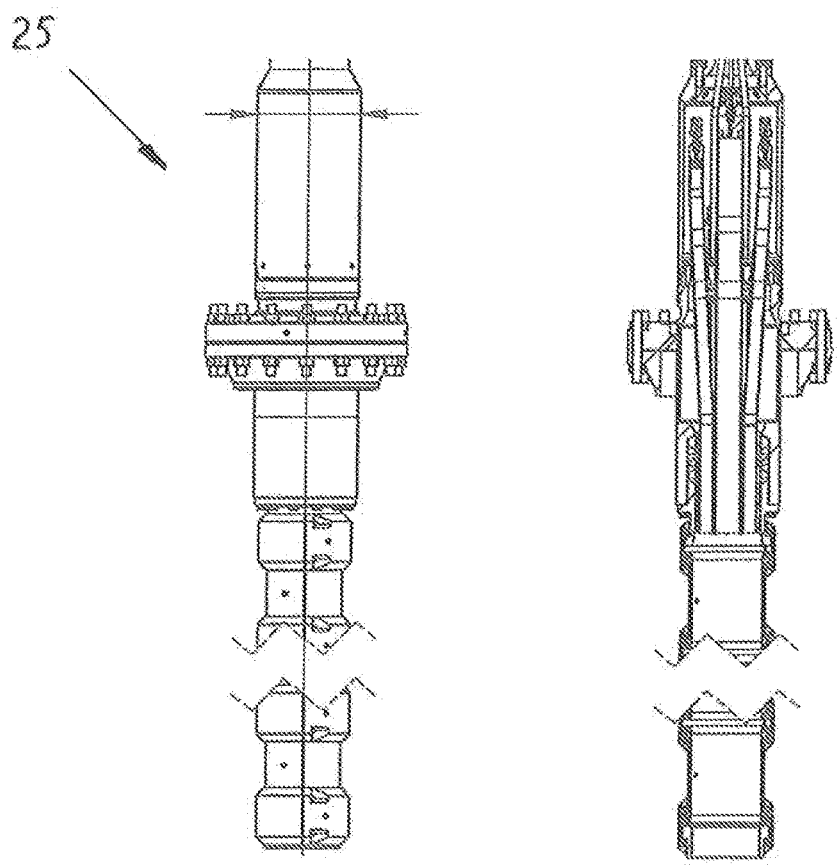
Figure 11:
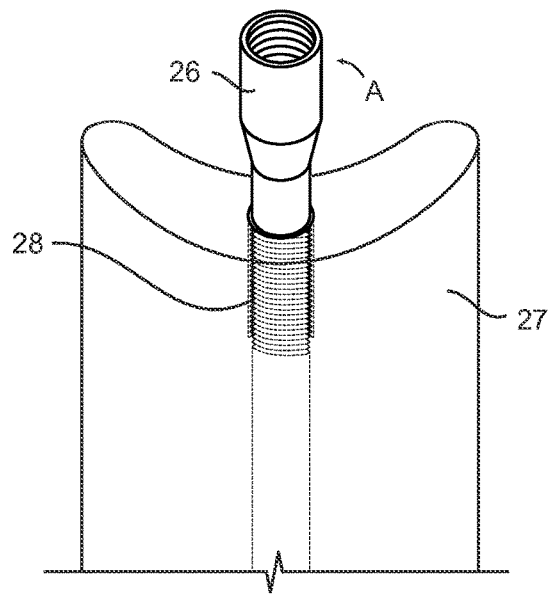
Figure 12:
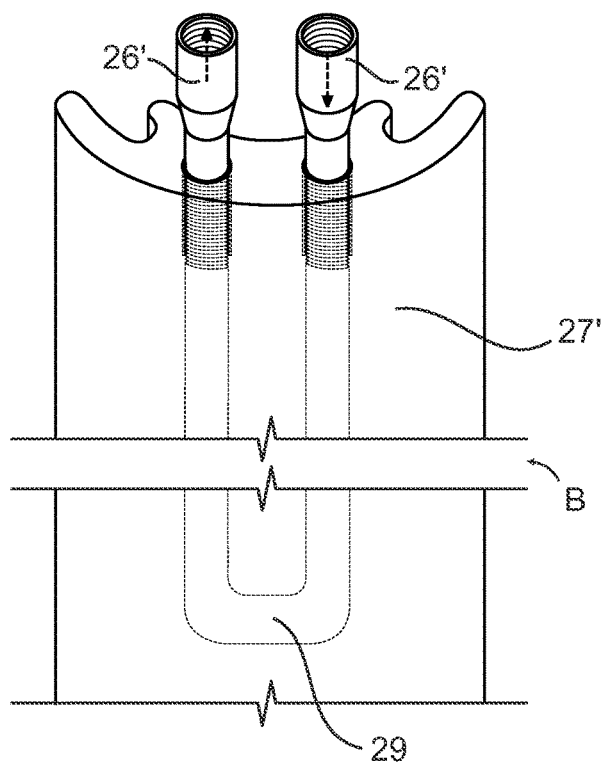
Figure 13:
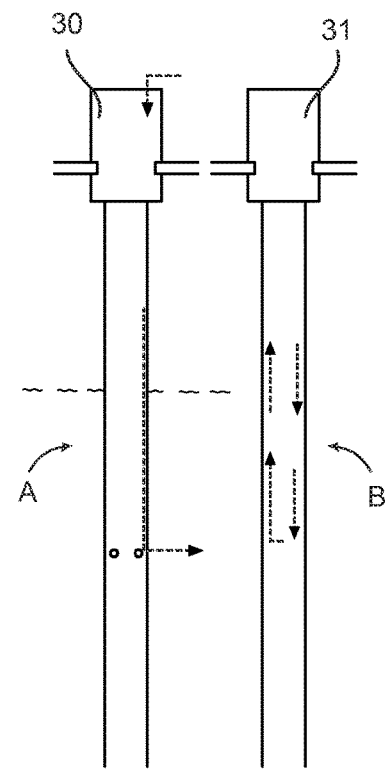

Other and further objects, features and advantages will appear from the following description of preferred embodiments of the invention, which is given for the purpose of description, and given in context with the appended drawings where:

FIG. 1 shows a temperature plot of a riser with four high power cables (conductor cores) without the cooling arrangement, FIG. 2 shows a temperature plot of the riser according to FIG. 1, when the invention is being used, FIG. 3 shows a cross sectional view of a first embodiment of a DEH riser cable, FIG. 4 shows a cross sectional view of a second embodiment of a DEH riser cable, FIG. 5 shows a cross sectional view of a third embodiment of a DEH riser cable, FIG. 6 shows a cross sectional view of a fourth embodiment of a DEH riser cable, FIG. 7 shows a cross sectional view of a fifth embodiment of a DEH riser cable, FIG. 8 shows a hangoff point at the upper on board end of a power umbilical, FIG. 9 shows an elevational view of the hang off point of FIG. 8, FIG. 10 shows in longitudinal section the hangoff point according to FIG. 9, FIG. 11 shows schematically a connection between a single cooling fluid supply pipe and a channel element, FIG. 12 shows an example of dual connection between a channel element and two pipes, and FIG. 13 shows schematically examples of the two systems.

The temperature plot showing the maximum temperature that occurs in a DEH riser cable $C_1$ having four conductor cores is shown in FIG. 1. The letter H indicates the hot zone and the letter C indicates a cold zone. Computations have been carried out given a current of 1430 A which is required for a U-value of 2.5 $Wm^2K$. As seen in the figure, the temperature limit of 90° C. is exceeded. The very same temperature plot in color and in a larger scale is included at the end of the description to illustrate the temperature regime in the transversal cross section of the cable $C_1$ with and without cooling. The elements of the DEH riser cable $C_1$ is described in detail with regard to FIG. 3.

FIG. 2 shows a solution with water cooling supplying 20° C. water in two 16 mm in diameter pipes close to the center of the DEH riser cable $C_1$. The maximum temperature is reduced to 70° C. with such water a cooling arrangement, which is well below the 90° C. limit. Thus a possible solution, as now suggested, is to reduce the temperature in the cable $C_1$ by using water, or other cooling agent, to cool down the inside of the cable/riser.

FIG. 3 shows a detailed cross sectional view of the DEH riser cable $C_1$ shown in FIGS. 1 and 2. The DEH riser cable $C_1$ has four heavy gauge high power cables or conductors 10, each having a transversal cross section area of 1600 $mm^2$, an outer diameter of 72.5 mm and a capacity of 6/10 kV. The DEH riser cable $C_1$ further includes five steel wires 8, 9 to carry the weight of the DEH riser cable $C_1$ and one 8 of them is centrally located, and four 9 of them are distributed peripherally in the cross section. In addition eight steel rods 7 are distributed peripherally in the cross section. Finally, filler material in the form of stiff elongate plastic elements 2, 3, 4, 5, 6, also called channel elements, are located at least partially around and between the electric power conductors 10, the steel wires 8, 9 and the steel rods 7. The central channel elements 6 have cooling fluid channels 6' provided in their profile. All these elements are gathered in a twisted bundle that was made by means of a laying and closing operation in a per se known manner. A protective sheath 1 encompasses the entire bundle of the above listed elements.

In this particular embodiment the cooling fluid is supplied to the wider channels shown in the central elements 6. In some usages, it is only some length or distance of the DEH riser cable $C_1$ that needs cooling, like the part suspending in the air from a surface vessel, and its extension some distance into the sea, a total of approximately 30-60 meters, to be mentioned as an example only. Thus, at some distance into the sea, transversally extending channels can be provided for discharging the cooling fluid, normally water, into the sea.

The cooling fluid can be supplied either by gravity alone, or being further forced by a pump as required for each individual project.

It is to be mentioned that in some circumstances, like in arctic areas, it can be necessary to provide a closed circuit for the cooling fluid. This means that the cooling fluid is returned to the surface and onto the vessel. This will be necessary when glycol or similar is used, which can not be discharged into the sea of environmental reasons. This means that the channels in the channel elements need to make a U-turn at a predetermined distance into the sea. Thus some of the channels are used for the supply of cooling fluid while the others are used for return of the cooling fluid. This is illustrated and described in detail with reference to FIGS. 12 and 13.

In one embodiment, if desired, the channels are not used for cooling fluid, but regular steel pipes of corrosion resistant material are used over the same distance. Also in this case it will be possible to make a closed circuit with U-turns and return of the cooling fluid to the surface. FIG. 4 shows a detailed cross sectional view of another embodiment of the DEH riser cable $C_2$ shown in FIGS. 1 and 2, now with the addition of four steel pipes 11 for the coolant. As in the previous embodiment, the DEH riser cable $C_2$ has four heavy gauge high power cables or conductors 10, each having a transversal cross section area of 1600 $mm^2$, an outer diameter of 72.5 mm and a capacity of 6/10 kV. The DEH riser cable $C_2$ further includes five heavy steel wires 8, 9 and eight smaller steel wires 12 to carry the weight of the DEH riser cable $C_2$. One of them is centrally located and is numbered 8, and four of them are numbered 9 and are distributed more peripherally in the cross section and eight of them are numbered 12 and are distributed peripherally in the cross section. Finally, filler material in the form of stiff elongate plastic elements 2', 3', 4', 5', also called channel elements, are located at least partially around and between the electric power conductors 10, the steel wires 8, 9, 12 and the steel pipes 11. All these elements are gathered in a twisted bundle that was made by means of a laying and closing operation in a per se known manner. A protective sheath 1' encompasses the entire bundle of the above listed elements.

FIG. 5 shows a cross sectional view of another embodiment of a DEH riser cable $C_3$ having six heavy gauge high power cables or conductors 10', each having an transversal cross section area of 1200 mm², an outer diameter of 69.5 mm and a capacity of 6/10 kV. The DEH riser cable $C_3$ further includes seven steel wires 8', 13 to carry the weight of the DEH riser cable $C_3$ and one of them is numbered 8' and is centrally located, and six of them are numbered 13 and are distributed peripherally in the cross section. In addition three steel rods 7 are distributed somewhat out of center in the cross section. Further, three 10 mm diameter steel tubes 11 are integrated in the cross section. The three steel tubes 11 are designed for the transportation of the cooling fluid. Filler material in the form of stiff elongate plastic elements 2", 3", 4", 5", also called channel elements, are located at least partially around and between the electric power conductors 10', steel wires 8', 13 and the steel rods 7. As before, all these elements are gathered in a twisted bundle that was made by means of a laying and closing operation in a per se known manner. A protective sheath 1" encompasses the entire bundle of the above listed elements.

FIG. 6 shows a cross sectional view of an embodiment of a combined power, control and DEH riser cable $C_4$ having two heavy gauge high power cables or conductors 10" only, each having an transversal cross section area of 1200 mm², an outer diameter of 67.9 mm and a capacity of 12/20 kV. The cable $C_4$ further includes eight steel wires 14, 15, 16, 17 to carry the weight of the cable $C_4$ and one of them is numbered 14 and is centrally located, and four of them are numbered 15, two of them 16 and one 17 and they are distributed in the cross section. In addition a number of steel tubes 18, 19 of different dimensions are distributed in the cross section. Further, there are four electrical wires 20 and three optical conductors 21 in the cross section. Filler material in the form of stiff elongate plastic elements 2''', 3''', 4''', 5''', also called channel elements, are located at least partially around and between the electric power conductors 10", steel wires 14, 15, 16, 17, electrical wires 20 and fibre optical conductors 21. The channel elements numbered 5''' have cooling fluid channels 6" provided in their profile. As before, all these elements are gathered in a twisted bundle that was made by means of a laying and closing operation in a per se known manner. It is here illustrated that a protective sheath can either be omitted or can encompasses the entire bundle of the above listed elements, which is indicated by reference 1''' where the outer sheath will be located.

FIG. 7 shows a detailed cross sectional view of still another embodiment of the DEH riser cable $C_5$ shown in FIG. 4, now without the four steel pipes, but with the addition of longitudinally extending coolant channels 22 provided in body of the peripheral channel elements 2' and intended for the coolant to flow there through. It is also shown radially extending channels 23 for the discharge of cooling fluid when such is environmental safe, like if the coolant is water. Otherwise all the elements are as in the FIG. 4 embodiment and will not be repeated here. It is to be noted, however, that the a pair of channels 22 can be arranged as one supply line and one return line to provide a closed circuit for the coolant. Then the radially extended channels 23 are omitted, and the channels are interconnected for fluid communication FIG. 8 just illustrates a typical hangoff point 25 at the upper on board end of a power umbilical, or a DEH power cable as described. Here all the elements of the cable are gathered and enter into the cable for extension into the sea. FIG. 9 shows an elevational view of such hangoff point as shown in FIG. 8, and FIG. 10 shows in longitudinal section the hangoff point according to FIG. 9.

FIG. 11 shows schematically a connection between a single cooling fluid supply pipe 26 and a channel element 27, which element 27 is also called the filler material. The connection can be made up by threads 28 provided in the channel element 27 and corresponding threads on the supply pipe 26 end.

FIG. 12 shows schematically an example of dual connection between the channel element 27' and the pipes 26' designed for a closed circuit with the return of cooling fluid. A crossover 29 is shown at the bottom of the element 27'. As indicated by arrows, one of the pipes 26' is prepared for supply of coolant, while the other is prepared for return of the coolant.

FIG. 13 shows schematically an example of the two systems A and B. The first one A to the left has a fluid inlet in the top at 30 and is designed for discharging the cooling fluid into the surrounding sea as indicated with the arrow at the lower end. The second one B to the right has a fluid inlet at the top 31 and has a closed circuit with return to the surface of the cooling fluid as indicated with the arrows.

Temperature Challenges and Cable Design

As mentioned and further stressed here, is that one of the most important parameters in the DEHC (Direct Electric Heating Cable) design is the temperature. This is an ongoing and continuous challenge in the oil field industries. The temperature of the cable varies trough the different operational conditions trough different parts of the system, from topside I-tube, bend stiffener, trench along the flowline etc. High voltage (HV) cables can be subjected to high temperatures and seawater in these areas. Such conditions can limit the electrical and mechanical lifetime of the polymer materials used in the cable design. The cable temperature should be kept well below the limit of 90° C. by choosing a sufficient cable conductor cross section to improve the service life.

A DEHC consists of an insulation system (semi-conductive insulation screens and an insulating material, typically cross-linked polyethylene: XLPE. In addition, in order to prevent water flowing longitudinally (e.g. after a cable service failure) in the conductor, a semi-conductive sealing material are filled in between the strands.

The DEHC design needs some modifications to the traditional HV cable design since the water barrier in such a traditional cable is made of metallic materials which will have negative effect on the heating effect. The DEHC has therefore got a wet design.

The invention claimed is:
1. A power cable, or power umbilical, comprising:
   a number of electric high power cables for transfer of large amounts of electric power/energy;
   filler material in the form of stiff elongate plastic elements located at least partially around and between the number of electric cables, said number of electric cables and stiff elongate plastic elements being gathered in a twisted bundle by means of a laying and closing operation; and
   at least one load carrying element at a predetermined location in the cross section of the power cable/umbilical,
   wherein the number of electric cables, the stiff elongate plastic elements and the at least one load carrying element, are either laid in a continuous helix, or alternately laid, i.e. by continuously alternating direction, in the entire or part of the longitudinal extension of the power cable/umbilical, to form a bundle,
   wherein at least one longitudinally extending channel is provided for forced flow transportation of a cooling agent through said power cable/umbilical in order to cool down the electric cables and their insulation material from a critical temperature value of about 90° C., and wherein the at least one longitudinally extending channel at some predefined distance extends into the sea and is provided with laterally extending draining holes that communicate the cooling agent into the surrounding sea.

2. A power cable, or power umbilical, comprising:

a number of electric high power cables for transfer of large amounts of electric power/energy;

filler material in the form of stiff elongate plastic elements located at least partially around and between the number of electric cables, said number of electric cables and stiff elongate plastic elements being gathered in a twisted bundle by means of a laving and closing operation; and at least one load carrying element at a predetermined location in the cross section of the power cable/umbilical, wherein the number of electric cables, the stiff elongate plastic elements and the at least one load carrying element, are either laid in a continuous helix, or alternately laid, i.e. by continuously alternating direction, in the entire or part of the longitudinal extension of the power cable/umbilical, to form a bundle, wherein at least one longitudinally extending channel is provided for forced flow transportation of a cooling agent through said power cable/umbilical in order to cool down the electric cables and their insulation material from a critical temperature value of about 90° C., and wherein the channels further include gaps, slits or any openings, transversally and/or longitudinally extending in said power cable/umbilical, said channels, gaps and slits enable flooding of the internals of said power cable/umbilical, which flooding enables heat transfer from the electric cables to the cooling agent for evacuation of said heat.

3. The power cable, or power umbilical, according to claim 1, wherein the at least one longitudinally extending channels are terminating on board a vessel at an umbilical hangoff point comprising cooling agent tubes connecting with said channels for transfer of said agent by means of gravity or by active pressure.

4. The power cable, or power umbilical, according to claim 1, wherein the cooling agent is water.

5. The power cable, or power umbilical, according to claim 1, wherein the cooling length of the power cable/umbilical extends over a length of 30-200 meters, where one crucial length is in open air from the umbilical hangoff point to the sea surface.

6. The power cable, or power umbilical, according to claim 1, wherein the power cable/umbilical comprises at least one fluid pipe in the cross section, of metal and/or plastic material.

7. The power cable, or power umbilical, according to claim 1, wherein a protective sheath encompasses the twisted bundle of electric power cables, the load carrying elements and the filler material.

8. The power cable, or power umbilical, according to claim 1, wherein the laterally extending draining holes also extend laterally through the outer sheath.

9. The power cable, or power umbilical, according to claim 6, wherein the power cable/umbilical comprises at least two fluid pipes of metallic material in the cross section, which fluid pipes are arranged in a closed circuit by means of a crossover piece between said fluid pipes, one of the fluid pipes being provided for the supply of cooling agent while the other fluid pipe being provided for the return to the surface of said cooling agent.

10. The power cable, or power umbilical, according to claim 1, wherein the cooling agent is an antifreeze coolant, such as a glycol based agent.

11. The power cable, or power umbilical, according to claim 1, wherein the load carrying elements are either steel wire ropes or steel rods or a combination of them.

12. The power cable, or power umbilical, according to claim 1, wherein the fluid pipes in the cross section also includes pipes for transport of other fluids like hydraulic fluid.

13. The power cable, or power umbilical, according to claim 1, wherein the power cable/umbilical further includes regular electric signal wires and/or fibre optic conductors.

* * * * *